(12) United States Patent
Yamamura

(10) Patent No.: US 8,055,898 B2
(45) Date of Patent: Nov. 8, 2011

(54) TAG AUTHENTICATION SYSTEM

(75) Inventor: Shinya Yamamura, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 650 days.

(21) Appl. No.: 12/213,803

(22) Filed: Jun. 24, 2008

(65) Prior Publication Data

US 2008/0320306 A1    Dec. 25, 2008

Related U.S. Application Data

(63) Continuation of application No. PCT/JP2005/024080, filed on Dec. 28, 2005.

(51) Int. Cl.
*H04L 9/32* (2006.01)

(52) U.S. Cl. ...................................... 713/168

(58) Field of Classification Search .................... 713/168
See application file for complete search history.

(56) References Cited

U.S. PATENT DOCUMENTS

2007/0262852 A1* 11/2007 Yamamura et al. ........ 340/10.51

FOREIGN PATENT DOCUMENTS

| JP | 11-282982   | 10/1999 |
|----|-------------|---------|
| JP | 2001-312471 | 11/2001 |
| JP | 2003-345413 | 12/2003 |
| JP | 2004-135058 | 4/2004  |
| JP | 2005-135032 | 5/2005  |

OTHER PUBLICATIONS

International Search Report mailed Apr. 4, 2006 in connection with the International Application No. PCT/JP2005/024080.
Japanese Office Action mailed Apr. 12, 2011 for corresponding Japanese Application No. 2007-552823 (Partial English-language translation).
Ford, Warwick et al., "Secure Electronic Commerce: Building the Infrastructure for Digital Signatures and Encryption," Japan, Prentice Hall, Dec. 24, 1997, the first impression of the first edition, pp. 90-93.

* cited by examiner

*Primary Examiner* — Peter Poltorak
*Assistant Examiner* — Stephen Sanders
(74) *Attorney, Agent, or Firm* — Fujitsu Patent Center

(57) ABSTRACT

An authentication method is disclosed that makes the identification information of an object public and performs authentication in referring, from the identification information, to the information of the object corresponding to the identification information. The method includes generating a third value through a predetermined operation of a temporary first value generated every time the identification information is referred to and a temporary second value generated for a referrer to the identification information; encrypting the third value by first and second different encryption methods; decrypting the third value encrypted by the first encryption method in a tag device attached to the object; and decrypting the third value encrypted by the second encryption method in an apparatus managing the information of the object, and comparing the third value decrypted in the apparatus with the third value decrypted in the tag device, thereby verifying the relationship between the object and the referrer thereto.

11 Claims, 15 Drawing Sheets

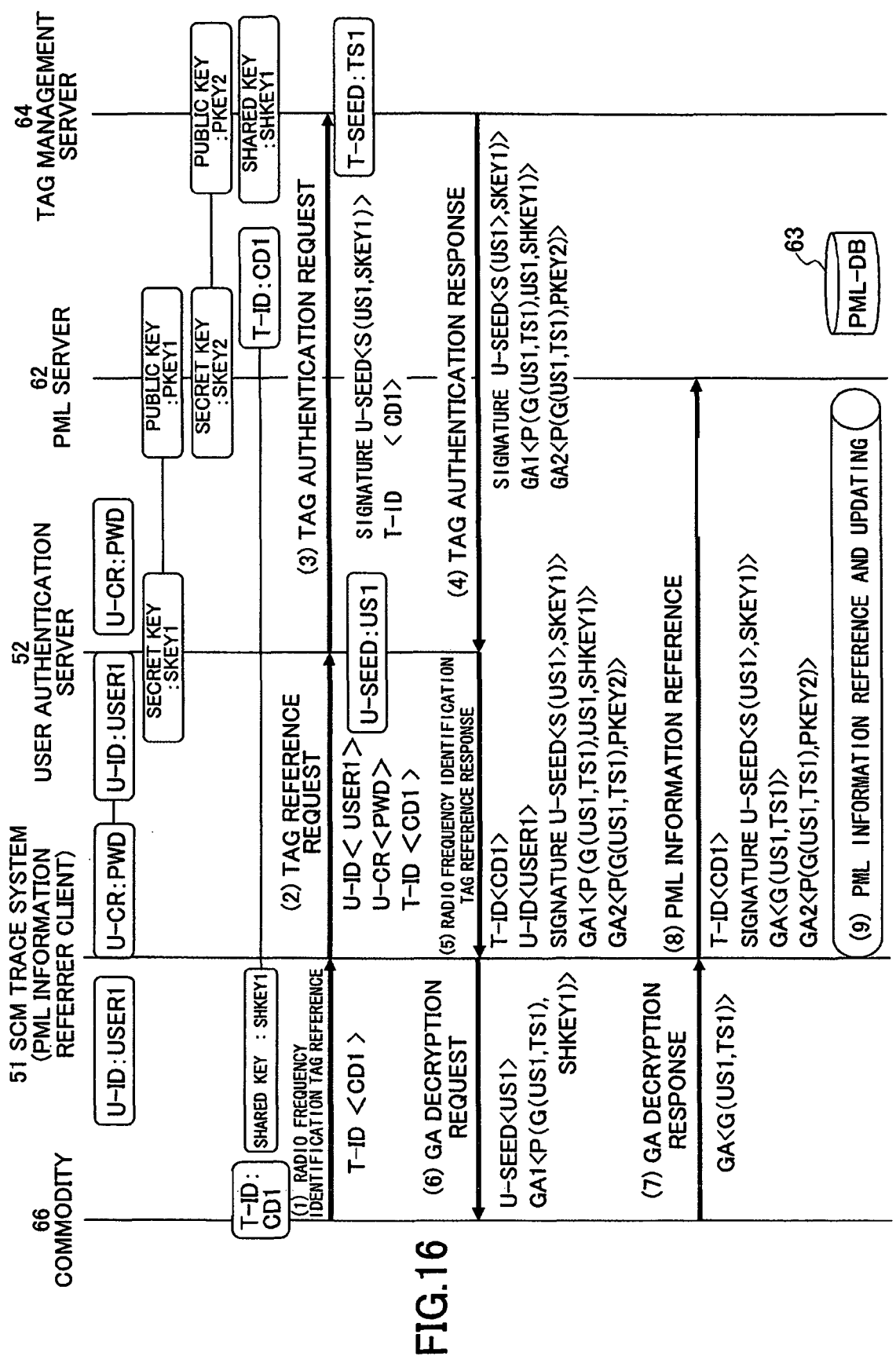

TAG AUTHENTICATION SYSTEM

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2005/024080, filed on Dec. 28, 2005, the entire contents of which are hereby incorporated by reference.

BACKGROUND OF THE INVENTION

1. Field of the Invention

The present invention relates to authentication methods, authentication systems, and their tag devices, information referrer clients, authentication servers, information servers, and tag management servers; and relates to an authentication method and authentication system that make public the identification information of an object and perform authentication in referring, from the identification information, to the information of the object corresponding to the identification information, and its tag device, information referrer client, authentication server, information server, and tag management server.

2. Description of the Related Art

Radio frequency identification tags have attracted attention as one of the basic technologies that support a future ubiquitous society, and various methods of using them have been devised in SCM (Supply Chain Management) and other fields. However, since there is no scheme for managing the relationship between a radio frequency identification tag and its referrer, there are various possible security concerns with respect to radio frequency identification tags.

Techniques have been devised for preventing radio frequency identification tags from being read at random, such as localizing the communications between a radio frequency identification tag and a reader by encrypting the information of the radio frequency identification tag using a dedicated encryption method, covering a radio frequency identification tag with a special shield, and preventing a reader from reading a radio frequency identification tag by providing a special radio frequency identification tag called a blocker tag. However, these methods can only choose between disclosing and not disclosing, and cannot control disclosure of multiple radio frequency identification tags individually.

Providing a scheme for freely controlling disclosure of the information of a radio frequency identification tag at will by its current manager is the point of popularization in providing services using this type of radio frequency identification tag attached to a product.

Patent Document 1 describes a network information setting method that sets the attribute information of a communications terminal in a second server as an initial setting when the communications terminal gets connected to a control network to which a first server that stores key information and the second server that stores attribute information are connected, wherein key information necessary for secure communications with the second server is obtained from the first server, and the attribute information containing at least the identifier and network address of the communications terminal is transmitted to the second server through secure communications using the key information.

Patent Document 2 describes a processing information management system having an input terminal and a processing information management apparatus connected through a network, wherein the processing information management apparatus has the function of checking double registration at the time of database registration and the function of checking a match between an input and an output by comparing their weight values.

[Patent Document 1] Japanese Laid-Open Patent Application No. 2005-135032

[Patent Document 2] Japanese Laid-Open Patent Application No. 2003-345413

Possible security concerns in conventional art include the following: first, intentional information manipulation that attacks the absence of a check on whether a radio frequency identification tag is properly referred to, and an information confusing attack that notifies a server of the same ID simultaneously at multiple points; and secondly, information tracking (illegal reading) that attacks the globality of the radio frequency identification tag (the capability of any radio frequency identification tag reader with the same standard to read the information of any radio frequency identification tag).

A specific example of the first problem is as follows. In the case of assuming, for example, a farm produce production management system using radio frequency identification tags, an agricultural chemical used in the process of growing vegetables may be automatically added to the management history of the vegetables by collecting information from a radio frequency identification tag attached to the agricultural chemical. In the case of notifying a production management system of the information of the radio frequency identification tag attached to the agricultural chemical, however, unless a check is made on whether the radio frequency identification tag of the agricultural chemical has been referred to, it is possible to have false information registered by falsely transmitting the ID of, for example, an agricultural chemical with less adverse effect that has not been actually used. Similar examples include falsifying office attendance and receiving a special offer without purchasing a commodity.

A specific example of the second problem is as follows. In the case where an ordinary consumer carries a CD, a book, and a notebook in a bag, and radio frequency identification tags are attached to them for product management, so that the consumer can refer to brief product information with a radio frequency identification tag reader mounted in a cellular phone, if the coverage of these radio frequency identification tags is approximately 3 m, it is possible to collect information on objects within 3 m around in addition to her/his personal belongings. It is not difficult to identify the owner of an object in an environment where people are somewhat scattered, such as a coffee shop. The information items collectible from individual objects are not harmful themselves, but it is possible to guess various things by combining these information items.

For example, it is possible to guess a person's liking from CDs or books by knowing the title of a commodity, and it is possible to guess a person's affluence to some extent by knowing the manufacturer of a notebook or bag. A similar example may be the case of scanning the stock status of another shop.

SUMMARY OF THE INVENTION

Embodiments of the present invention may solve or reduce one or more of the above-described problems.

According to one embodiment of the present invention, there is provided an authentication method and authentication system capable of certifying that the information of a tag device is referred to by a valid referrer by correlating the tag device with information on the referrer, and its tag device, information referrer client, authentication server, information server, and tag management server.

According to one embodiment of the present invention, there is provided an authentication method making identification information of an object public and performing authentication in referring, from the identification information, to information of the object corresponding to the identification information, the authentication method including the steps of generating a third value through a predetermined operation of a temporary first value generated every time the identification information is referred to and a temporary second value generated for a referrer to the identification information; encrypting the third value by first and second encryption methods different from each other; decrypting the third value encrypted by the first encryption method in a tag device attached to the object; and decrypting the third value encrypted by the second encryption method in an apparatus managing the information of the object, and comparing the third value decrypted in the apparatus with the third value decrypted in the tag device, thereby verifying a relationship between the object and the referrer thereto.

According to one embodiment of the present invention, there is provided an authentication system including a tag device attached to an object and configured to make identification information of the object public and decrypt a third value encrypted by a first encryption method; an information referrer client configured to refer to information of the object corresponding to the identification information of the object made public by the tag device; an authentication server configured to authenticate a referrer to the object and generate a temporary second value for the referrer to the identification information; a tag management server configured to generate a temporary first value every time the identification information is referred to, to generate a third value through a predetermined operation of the first value and the second value from the authentication server, and to encrypt the third value by the first encryption method and a second encryption method different from each other; and an information server configured to manage the information of the object corresponding to the identification information, and to verify a relationship between the object and the referrer thereto by decrypting the third value encrypted by the second encryption method and comparing the decrypted third value with the third value decrypted in the tag device, wherein the information referrer client is allowed to refer to the information of the object corresponding to the identification information in response to the verification by the information server.

According to one embodiment of the present invention, there is provided a tag device of an authentication system making identification information of an object public and performing authentication in referring, from the identification information, to information of the object corresponding to the identification information, the tag device including a tag information management part configured to return the identification information of the object in response to a request from an information referrer client referring to the information of the object; and a decryption part configured to decrypt a third value encrypted by a first encryption method.

According to one embodiment of the present invention, there is provided an information referrer client of an authentication system making identification information of an object public and performing authentication in referring, from the identification information, to information of the object corresponding to the identification information, the information referrer client including a client authentication part configured to make a reference request by attaching, to identification information of an object made public by a tag device, user information corresponding to a referrer to the identification information, and transmit a third value encrypted by a first encryption method and contained in a response to the reference request to the tag device attached to the object; and an information reference part configured to make an information reference request to an information server managing the information of the object corresponding to the identification information by including therein the identification information of the object made public by the tag device, the third value decrypted in and returned from the tag device, and the third value encrypted by a second encryption method and contained in the response to the reference request.

According to one embodiment of the present invention, there is provided an authentication server of an authentication system making identification information of an object public and performing authentication in referring, from the identification information, to information of the object corresponding to the identification information, the authentication server including a user authentication part configured to authenticate a user by searching a user authentication database containing information on a plurality of users by information on the user from an information referrer client; a second value generation part configured to generate a temporary second value for a referrer to the identification information in response to the user authentication; and an authentication request part configured to make an authentication request to a tag management server using the identification information of the object and the second value, wherein a third value encrypted by a first encryption method and the third value encrypted by a second encryption method transmitted from the tag management server as a response to the authentication request are transmitted to the information referrer client.

According to one embodiment of the present invention, there is provided an information server of an authentication system making identification information of an object public and performing authentication in referring, from the identification information, to information of the object corresponding to the identification information, the information server including an object information database containing the information of the object corresponding to the identification information; and a reference authentication part configured to verify a relationship between the object and a referrer thereto by decrypting a third value encrypted by a second encryption method and transmitted from an information referrer client and comparing the decrypted third value with the third value transmitted from the information referrer client, and refer to the object information database using the identification information of the object transmitted from the information referrer client in response to the verification.

According to one aspect of the present invention, it is possible to correlate a tag device with referrer information and to certify that the information of the tag device is referred to by a valid referrer.

BRIEF DESCRIPTION OF THE DRAWINGS

Other objects, features and advantages of the present invention will become more apparent from the following detailed description when read in conjunction with the accompanying drawings, in which:

FIG. 16 is a diagram for illustrating the details of a tag authentication scheme of the present invention.

DETAILED DESCRIPTION OF THE PREFERRED EMBODIMENTS

A description is given, with reference to the drawings, of a mode of implementation of the present invention.

Figure 1:
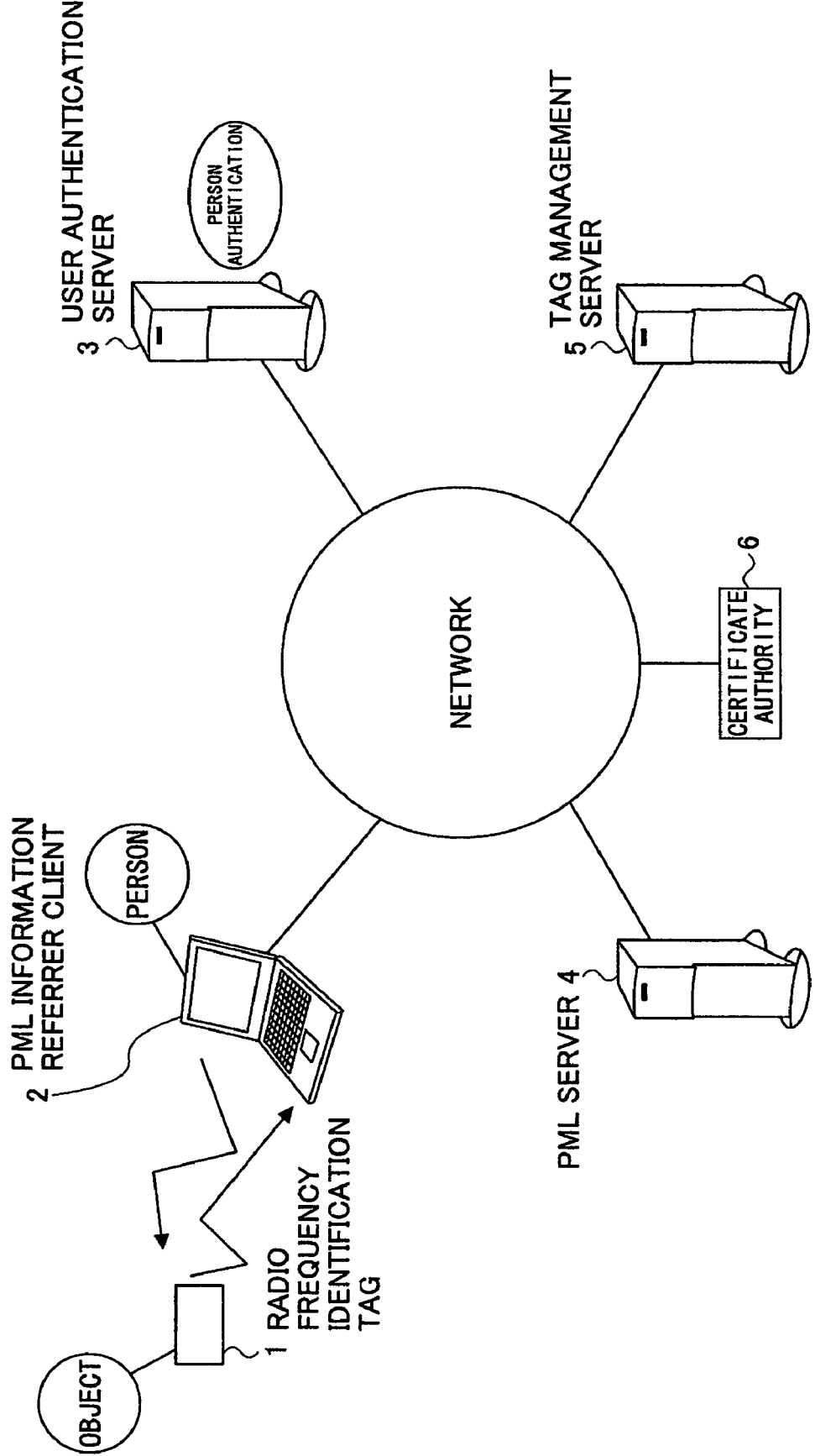
FIG. 1 is a configuration diagram of a mode of implementation of a radio frequency identification tag authentication system of the present invention.

FIG. 1 shows a configuration diagram of a mode of implementation of a radio frequency identification tag authentication system of the present invention. In the drawing, a radio frequency identification tag 1 is a device that has the function of decrypting and making public a group authenticator GA transmitted from a tag management server 5 in order to certify that the radio frequency identification tag 1 is referred to. The present invention is not concerned with the communication principle of the radio frequency identification tag 1, and the radio includes optical means such as infrared. Further, the radio frequency identification tag includes a contact-type device such as an IC card.

In this specification, information on an object is described with a term PML information, but this is not limited to those using PML (Physical Markup Language) defined by EPC global. The term PML information contains information on an object converted into data in some kind of format.

A PML information referrer client 2 is a communication device such as a PC (Personal Computer), PDA (Personal Digital Assistant), or a cellular phone with a radio frequency identification tag reader, or a server computer that controls multiple radio frequency identification tags. The PML information referrer client 2 has the function of clearly indicating the reference relationship with the radio frequency identification tag 1 before referring to object information (PML information) indicated by the radio frequency identification tag 1 by receiving a group authenticator GA2 encrypted with the public key of a PML server 4 and a group authenticator GA1 encrypted with a secret shared with the radio frequency identification tag 1 from a tag management server 5 and transmitting the GA1 and the group authenticator obtained by decrypting the GA2 with the radio frequency identification tag to the PML server 4 when accessing the PML server 4.

A user authentication server 3 is an apparatus having the function of authenticating a user who refers to PML information and issuing a one-time password for a user U-SEED to the PML server 4. The present invention is not concerned with the user authentication method, and any authentication protocol capable of transmitting radio frequency identification tag information required in the present invention as additional information can be used.

The PML server 4 is an apparatus having the function of controlling disclosure of PML information that is object-related information defined in XML format by authenticating the relationship between a user and an object by decrypting the group authenticator GA2, encrypted with the public key of the PML server 4 itself and transmitted from the PML information referrer client 2, with a decryption key and comparing it with the group authenticator also transmitted from the PML information referrer client 2.

The tag management server 5 is an apparatus managing reference to the radio frequency identification tag, which generates a one-time password for a radio frequency identification tag T-SEED in order to certify valid reference to the radio frequency identification tag 1, generates the group authenticator GA from it and the one-time password for a user U-SEED transmitted from the user authentication server 3, encrypts the group authenticator GA with each of the shared secret of the radio frequency identification tag and the public key of the PML server 4, and issues encrypted group authenticators.

A certificate authority 6 is an authoritative organization that verifies the legitimacy of the user authentication server 3, the PML server 4, and the tag management server 5, and guarantees the validity of the public key of the PML server 4 registered with the tag management server 5.

A brief description is given of an authentication sequence according to the present invention. The user authentication server 3 issues the one-time password U-SEED to the tag management server 5, and the tag management server 5 generates a group authenticator GA from it and the one-time password T-SEED it generates. The tag management server 5 returns the group authenticator GA2 encrypted with the public key of the PML server 4 and the group authenticator GA1 encrypted with the secret shared with the radio frequency identification tag 1 to the PML information referrer client 2 via the user authentication server 3. The PML information referrer client 2 decrypts the group authenticator GA1 by way of the radio frequency identification tag 1, and transmits it together with the group authenticator GA2 to the PML server 4. The PML server 4 performs authentication by decrypting the group authenticator GA2, and compares it with the group authenticator GA.

Figure 2:
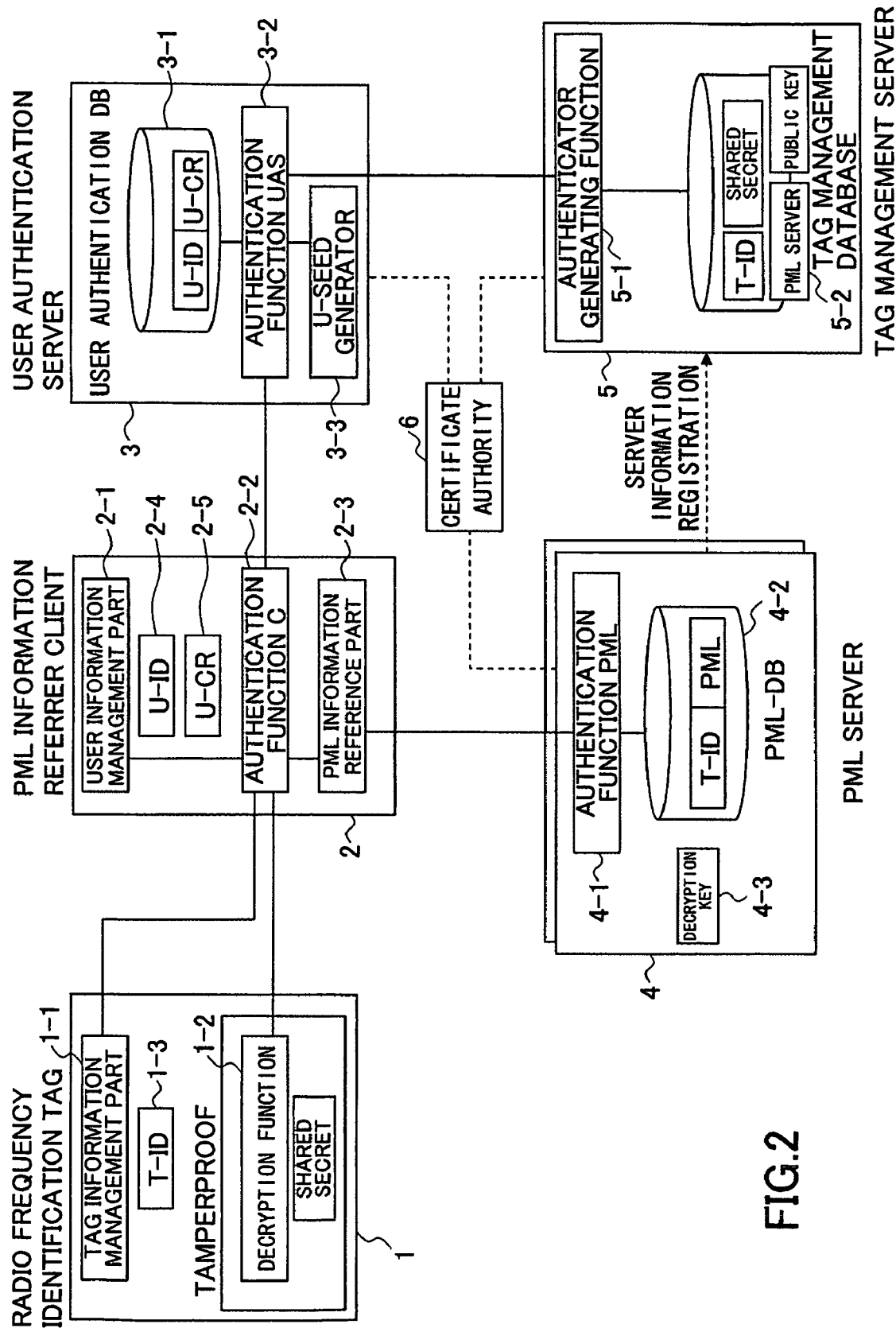
FIG. 2 is a functional block diagram of each apparatus of the radio frequency identification tag authentication system of the present invention.

FIG. 2 shows a functional block diagram of each apparatus of the radio frequency identification tag authentication system of the present invention. The substance of each functional block is a program, which is loaded into a memory (such as a RAM) and executed by the central processing unit (CPU) of an apparatus in which the functions of the present invention are implemented.

In FIG. 2, the radio frequency identification tag 1 includes a tag information management part 1-1 and a decryption function 1-2. The tag information management part 1-1 contains a tag identifier T-ID 1-3 in an internal memory, and transmits the tag identifier T-ID 1-3 in response to a radio read request from a referrer apparatus.

The decryption function 1-2 has a key shared with the tag management server 5 for decrypting an encrypted group authenticator. The decrypting function 1-2 decrypts a group authenticator generated and encrypted with the shared key in the tag management server 5 and transmitted from the PML information referrer client 2, and returns the decrypted group authenticator to the PML information referrer client 2.

The PML information referrer client 2 includes a user information management part 2-1, a group authentication function C (Client) 2-2, and a PML information reference part 2-3.

The user information management part 2-1 contains and manages a user identifier U-ID 2-4 and a user credential U-CR 2-5 in an internal memory. The group authentication function C 2-2 makes a radio frequency identification tag reference request to the user authentication server 3 by combining the tag identifier T-ID 1-3 read from the radio frequency identification tag 1 and the U-ID 2-4 and the U-CR 2-5 retained in the user information management part 2-1, and transmits the group authenticator protected by the shared key and transmitted in a radio frequency identification tag reference response message to the decryption function 1-2 of the radio frequency identification tag 1.

The PML information reference part 2-3 makes to the PML server 4 a PML information request containing the group authenticator GA decrypted in the radio frequency identification tag 1 and the group authenticator GA2 encrypted with the public key of the PML server 4 and transmitted in the radio frequency identification tag reference response message.

The user authentication server 3 includes an authentication function UAS (User Agent Server) 3-2, a U-SEED generator 3-3, and a user authentication DB (database) 3-1.

The authentication function UAS 3-2 performs user authentication by comparing the user identifier U-ID 2-4 and the user credential U-CR 2-5 transmitted in the radio frequency identification tag reference request message with a U-ID and a U-CR contained in the user authentication DB 3-1. When the authentication succeeds, the authentication function UAS 3-2 generates the one-time password U-SEED using the U-SEED generator 3-3, and makes a tag authentication request by transmitting it together with the tag identifier T-ID 1-3 to the tag management server 5. Further, the authentication function UAS 3-2 transmits the group authenticator GA1 and the group authenticator GA2, encrypted with the shared secret of the radio frequency identification tag and the tag management server 5 and by the public key of the PML server 4, respectively, and transmitted from the tag management server 5, to the PML information referrer client 2.

The U-SEED generator 3-3 generates a user's secret information related to the current tag identifier T-ID 1-3. The method of generating the one-time password U-SEED is not limited, and it is, for example, a digit sequence generated with 128-bit random numbers.

Figure 3:
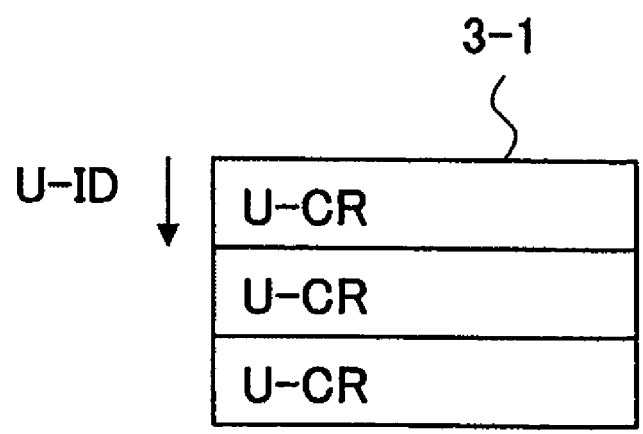
FIG. 3 is a diagram showing a configuration of a user authentication DB 3-1.

FIG. 3 shows a configuration of the user authentication DB 3-1. The user authentication DB 3-1 includes the user credential U-CR corresponding to the user identifier U-ID. The U-ID, which is a user ID that uniquely identifies a user, is a user account, for example. The U-CR is a user credential that certifies the user. The present invention does not particularly define what the credential is, but it is, for example, a password or a certificate issued by the certificate authority 6.

Next, the PML server 4 includes an authentication function PML (Physical Markup Language server) 4-1 and a PML-DB (database) 4-2, and has a decryption key 4-3 as a secret key.

In response to a PML information calling request from the PML information referrer client 2, the authentication function PML 4-1 decrypts the group authenticator GA2, encrypted with the public key of the requested PML server 4 itself, with the decryption key 4-3. The authentication function PML 4-1 verifies the validity of the relationship between the tag and a referrer user by comparing the decrypted group authenticator GA with the group authenticator GA of which it has been notified by the PML information referrer client 2. If it is successfully verified, the authentication function PML 4-1 extracts PML from the PML-DB 4-2, and transmits it to the PML information referrer client 2.

Figure 4:
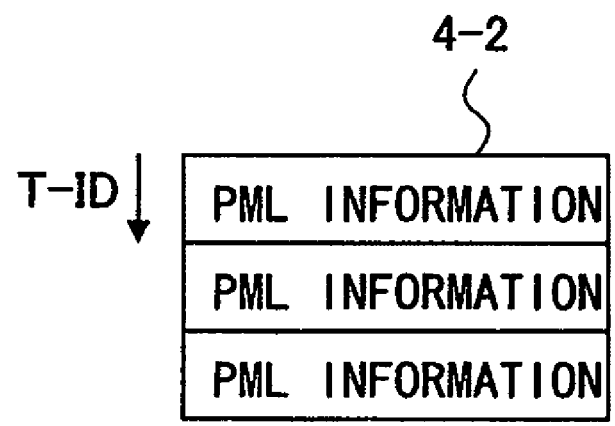
FIG. 4 is a diagram showing a configuration of a PML-DB 4-2.

FIG. 4 shows a configuration of the PML-DB 4-2. The PML-DB 4-2 includes PML information corresponding to the tag identifier T-ID. The tag identifier T-ID is a value that uniquely identifies a radio frequency identification tag. The PML information is object-related information defined in XML format.

Next, the tag management server 5 includes an authenticator generating function 5-1 and a tag management DB (database) 5-2. In response to reception of a tag authentication request from the user authentication server 3, the authenticator generating function 5-1 generates the one-time password T-SEED, and generates the group authenticator GA from it and the one-time password U-SEED transmitted in the tag authentication request message. The group authenticator GA is calculated by GA=G(T-SEED, U-SEED), where G( ) is a hash function.

Further, the tag management server 5 extracts the secret key shared with the radio frequency identification tag 1 by searching the tag management DB 5-2 by the T-ID 1-3 transmitted from the user authentication server 3. Further, the tag management server 5 extracts the public key of the PML server 4 with the identifier of the PML server 4 transmitted from the user authentication server 3. The tag management server 5 encrypts the GA with each of the keys, thereby generating the two encrypted group authenticators GA1 and GA2, and transmits them to the user authentication server 3.

Figure 5:
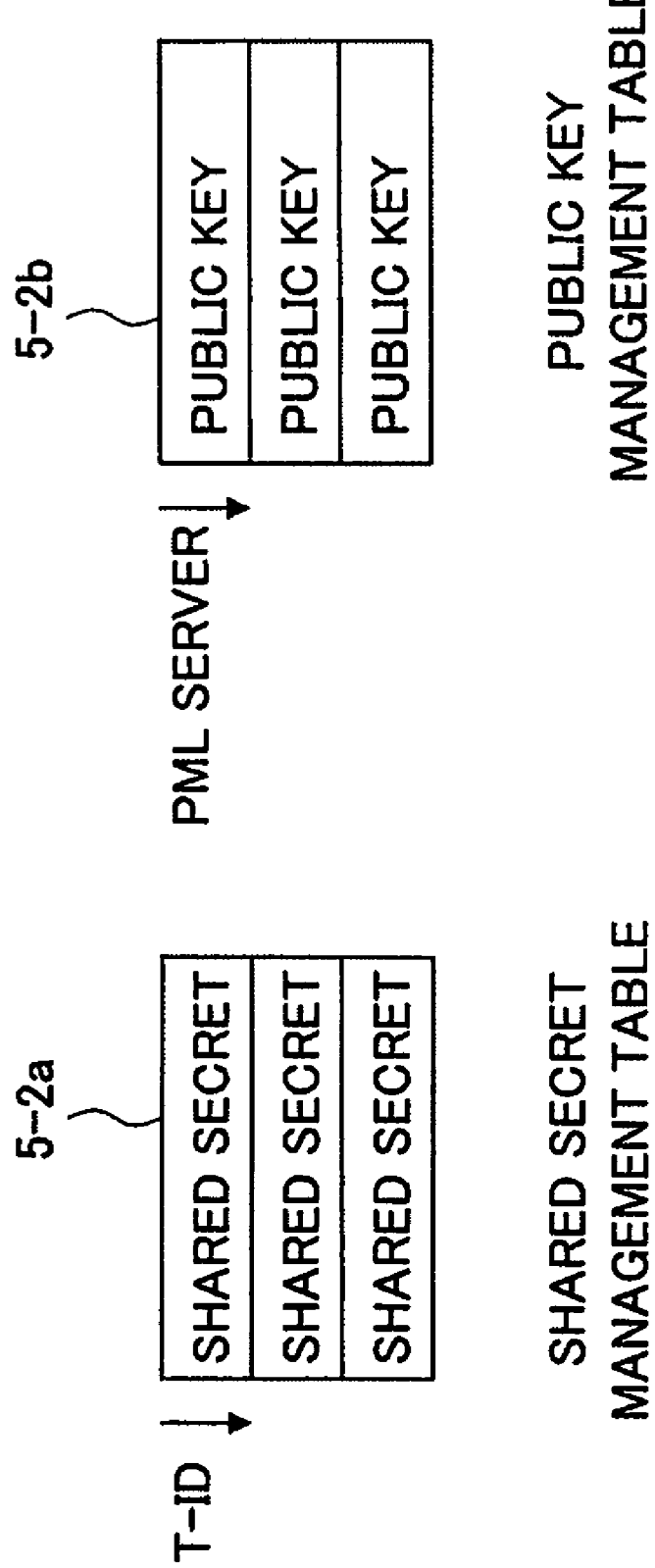
FIG. 5 is a diagram showing a configuration of a tag management DB 5-2.

FIG. 5 shows a configuration of the tag management DB 5-2. The tag management DB 5-2 includes a shared secret management table 5-2a and a public key management table 5-2b. The shared secret management table 5-2a includes a shared secret corresponding to the tag identifier T-ID. The shared secret is a secret key shared between the PML and the radio frequency identification tag 1. The public key management table 5-2b includes a public key corresponding to the identifier of the PML server 4.

Figure 6:
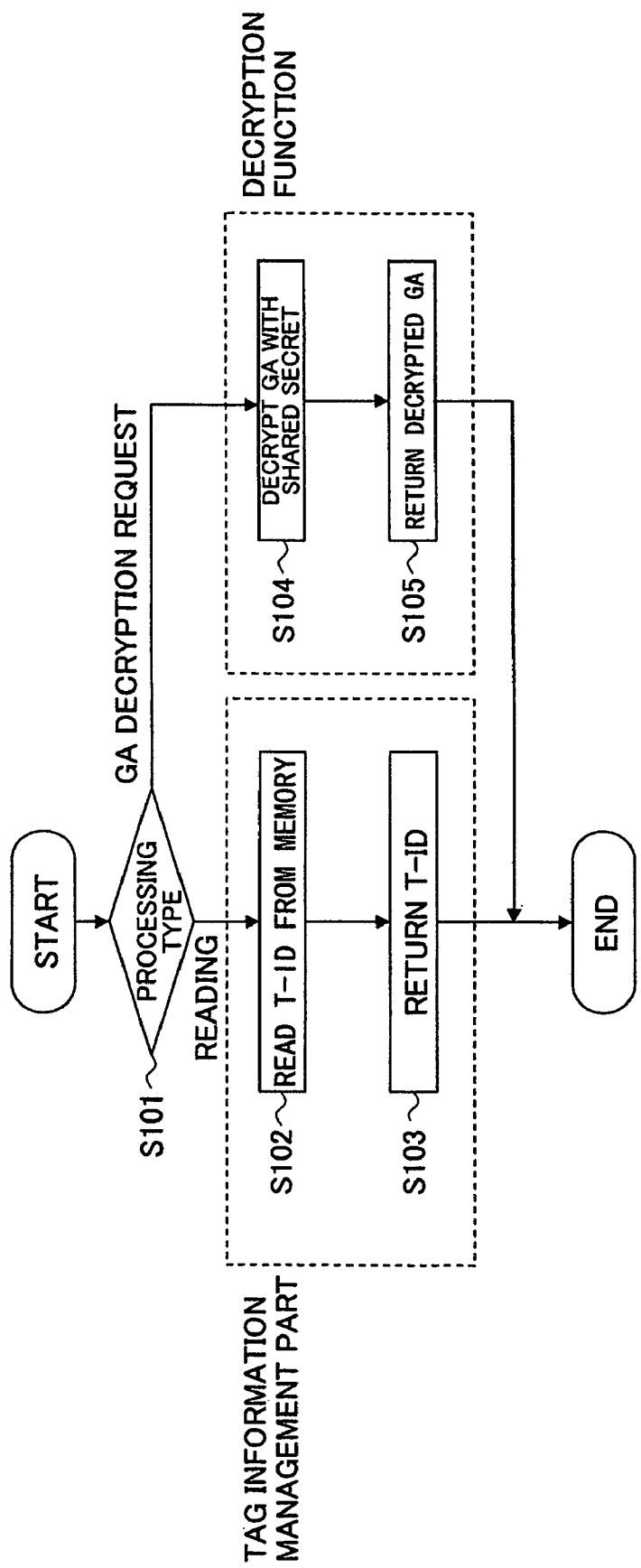
FIG. 6 is a processing flowchart of a radio frequency identification tag 1.

FIG. 6 shows a processing flowchart of the radio frequency identification tag 1. In the drawing, in step S101, a command transmitted by radio from a referrer apparatus is analyzed. If it is a read request, in step S102, the tag information management part 1-1 is activated, and if it is a GA decryption request, in step S104, the decryption function 1-2 is activated.

In the case of a read request, in step S102, the tag identifier T-ID 1-3 is read from a built-in memory, and in step S103, the T-ID 1-3 is returned to the referrer apparatus. In the case of a GA decryption request, in step S104, the encrypted group authenticator GA1 transmitted in the decryption request command is decrypted using a shared key, and in step S105, the decrypted group authenticator GA is returned to the PML information referrer client 2.

Figure 7:
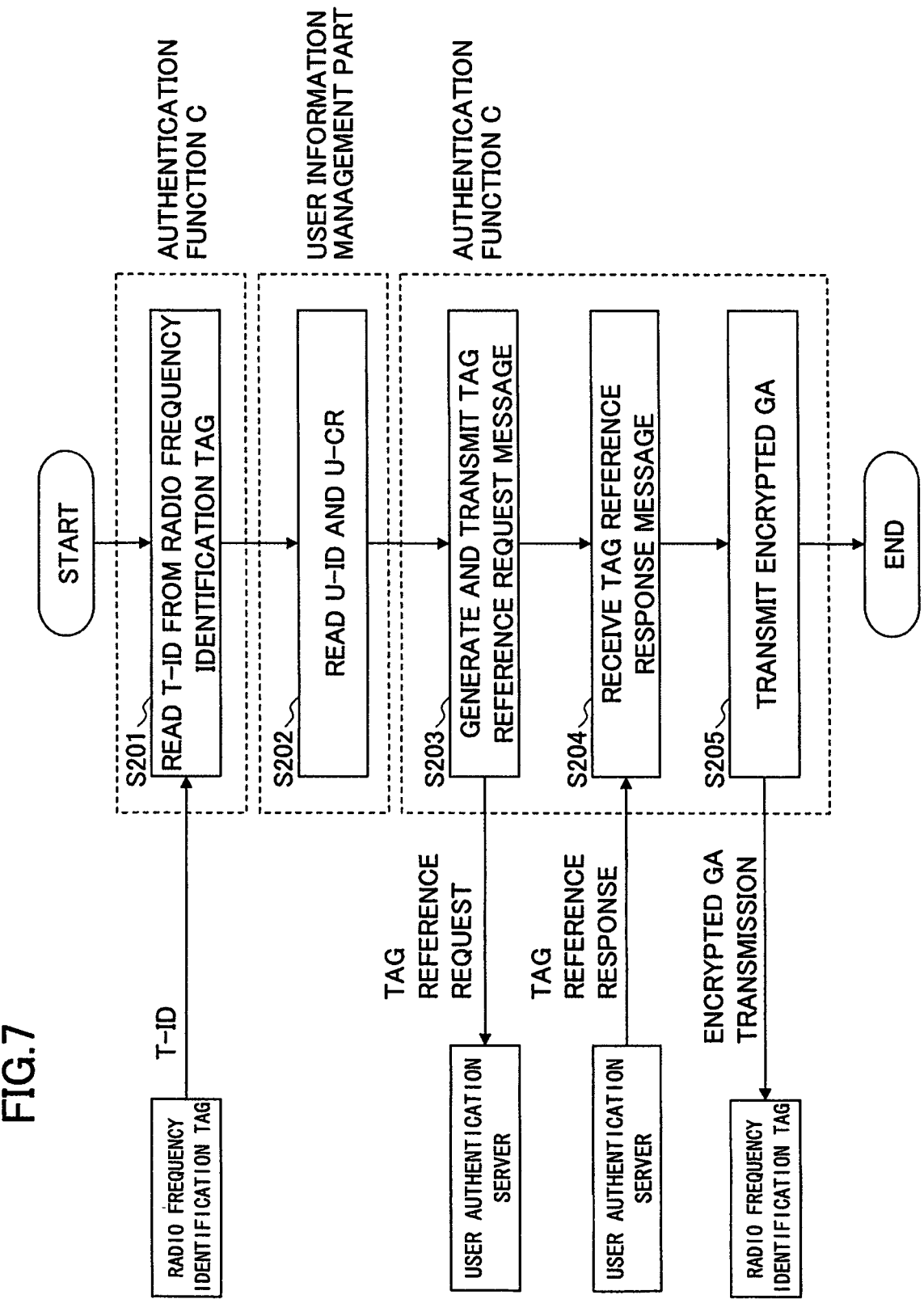
FIG. 7 is a processing flowchart of a PML information referrer client 2 at the time of referring to the radio frequency identification tag.
Figure 8:
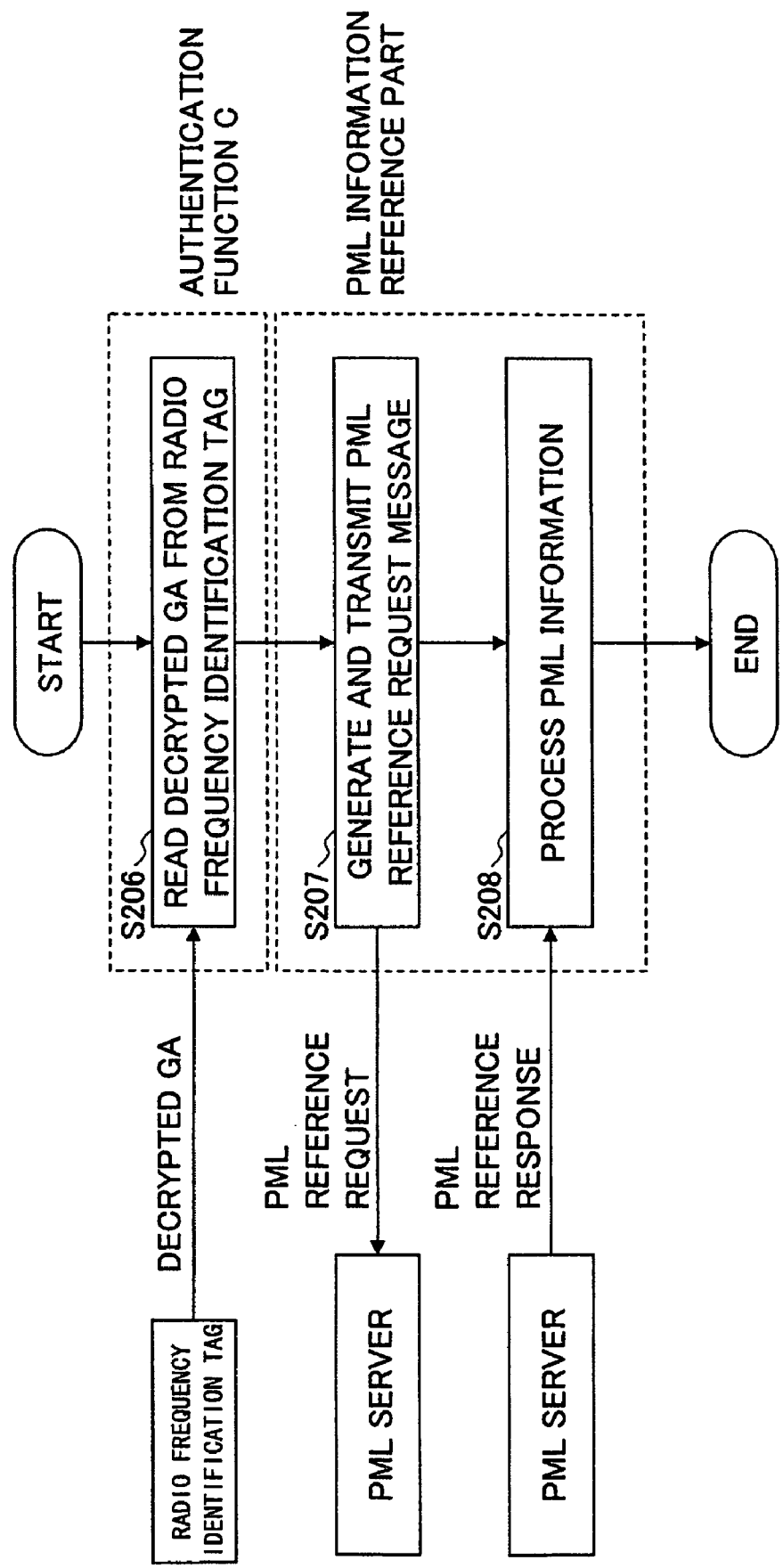
FIG. 8 is a processing flowchart of the PML information referrer client 2 at the time of referring to PML information.

FIG. 7 shows a processing flowchart of the PML information referrer client 2 at the time of referring to the radio frequency identification tag, and FIG. 8 shows a processing flowchart of the PML information referrer client 2 at the time of referring to PML information.

In FIG. 7, in step S201, the authentication function C 2-2 transmits a READ command to the radio frequency identification tag 1 by radio, and reads the tag identifier T-ID 1-3. In step S202, the user information management part 2-1 reads the user identifier U-ID 2-4 and the user credential U-CR 2-5.

In step S203, the authentication function C 2-2 generates a tag reference request message in which the T-ID 1-3, U-ID 2-4, and U-CR 2-5 are set, and transmits it to the user authentication server 3. In step S204, the authentication function C 2-2 receives a tag reference response message returned from the user authentication server 3. In step S205, the authentication function C 2-2 transmits the encrypted group authenticator GA1 transmitted in the tag reference response message to the radio frequency identification tag 1 in a DECRYPT command using radio.

In FIG. 8, in step S206, the authentication function C 2-2 receives the group authenticator GA decrypted as a response to the DECRYPT command by the radio frequency identification tag 1. In step S207, the PML information reference part 2-3 generates a PML reference request message containing the group authenticator GA decrypted in the radio frequency identification tag 1 and the group authenticator GA2 encrypted with the public key of the PML server 4 and transmitted in the radio frequency identification tag reference response message, and transmits it to the PML server 4. In step S208, the PML information reference part 2-3 receives a PML reference response message transmitted from the PML server 4, and processes PML information.

Figure 9:
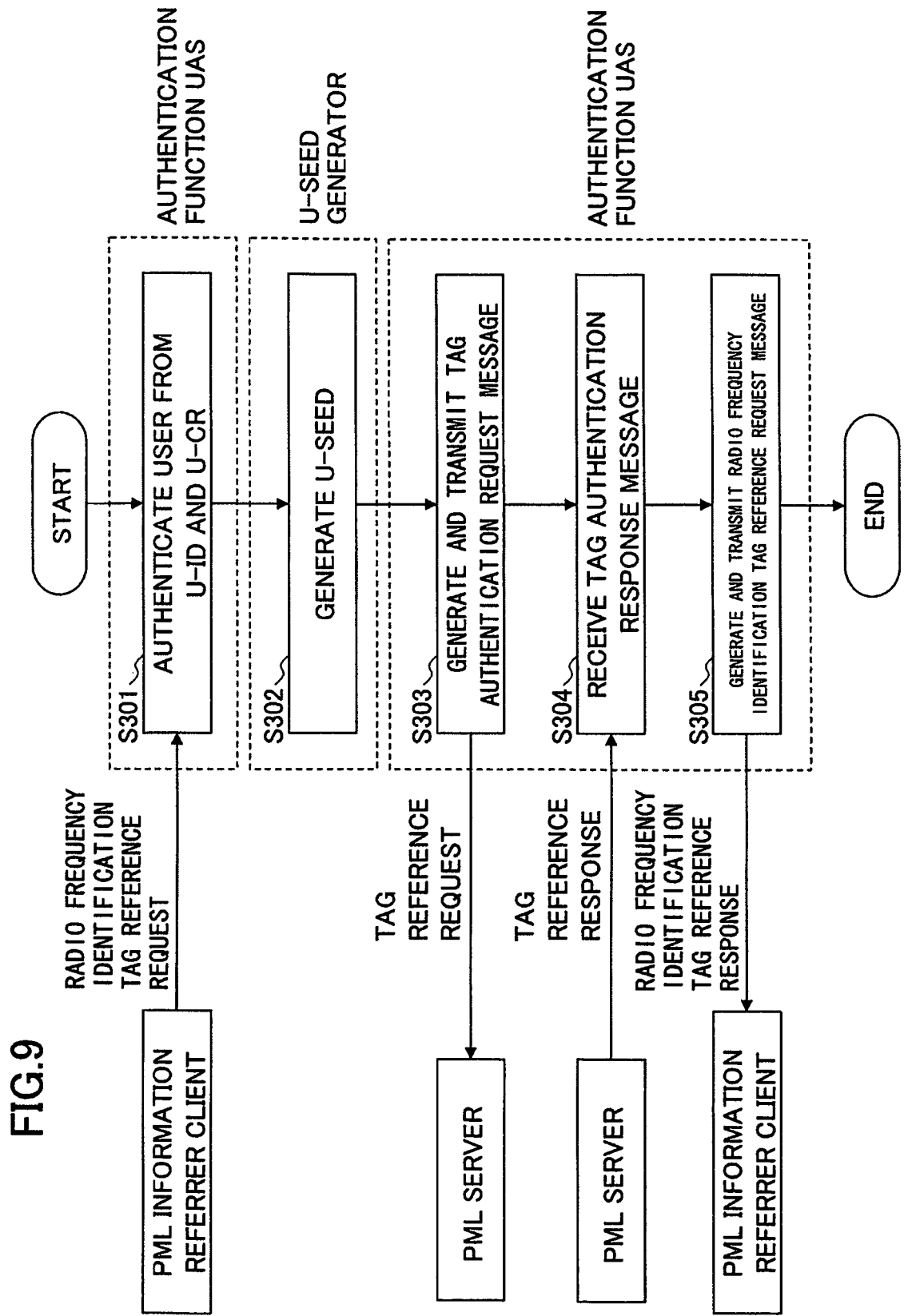
FIG. 9 is a processing flowchart of a user authentication server.

FIG. 9 shows a processing flowchart of the user authentication server 3. In the drawing, in step S301, the authentication function UAS 3-2 extracts the U-ID 2-4 and the U-CR 2-5 from a radio frequency identification tag reference request message, and authenticates a user by comparing them with the U-ID and the U-CR contained in the user authentication DB 3-1.

In step S302, the U-SEED generator 3-3 generates the U-SEED and digitally signs the U-SEED with the encryption key of the user authentication server 3.

In step S303, the authentication function UAS 3-2 generates a tag authentication request message in which the tag identifier T-ID 1-3 and the digitally signed U-SEED are set, and sends it to the tag management server 5. In step S304, the authentication function UAS 3-2 receives a tag authentication response message sent from the tag management server 5.

In step S305, the authentication function UAS 3-2 sends the group authenticator GA1 and the group authenticator GA2, encrypted with the shared key of the radio frequency identification tag 1 and the tag management server 5 and by the public key of the PML server 4, respectively, and set in the tag authentication response message, to the PML information referrer client 2.

Figure 10:
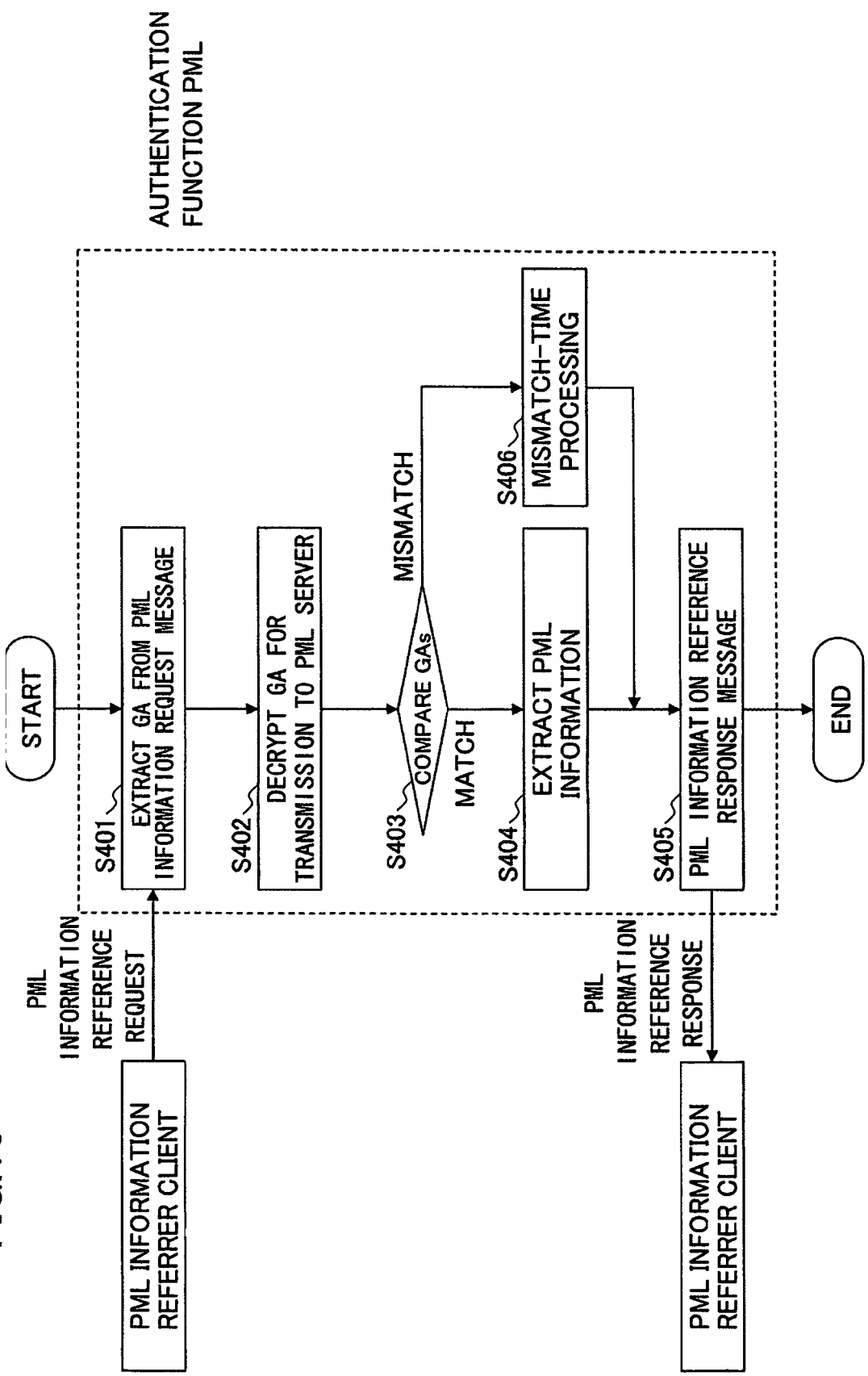
FIG. 10 is a processing flowchart of a PML server 4.

FIG. 10 shows a processing flowchart of the PML server 4. In the drawing, in step S401, the authentication function PML 4-1 extracts the group authenticator GA2 encrypted with the public key of the PML server 4 and the decrypted group authenticator GA from a PML information request message from the PML information referrer client 2.

In step S402, the authentication function PML 4-1 decrypts the group authenticator GA2 encrypted with the public key of the PML server 4 and extracted from the message using the decryption key 4-3, thereby obtaining the group authenticator GA. In step S403, the authentication function PML 4-1 compares the group authenticator GA transmitted in the message and the calculated group authenticator GA. If the comparison result is a match, it proceeds to step S404, and if the comparison result is a mismatch, it proceeds to step S406.

If the comparison result is a match, in step S404, the authentication function PML 4-1 searches the PML-DB 4-2 by the tag identifier T-ID 1-3, and extracts PML information.

If the comparison result is a mismatch, in step S406, the authentication function PML 4-1 performs mismatch-time processing. This processing depends on a service and the information disclosure policy of the PML server 4, and may be, for example, making the granularity of information disclosure coarse or disclosing no PML information.

Thereafter, in step S405, the authentication function PML 4-1 generates a PML information reference response message in which PML information is set, and sends it to the PML information referrer client 2.

Figure 11:
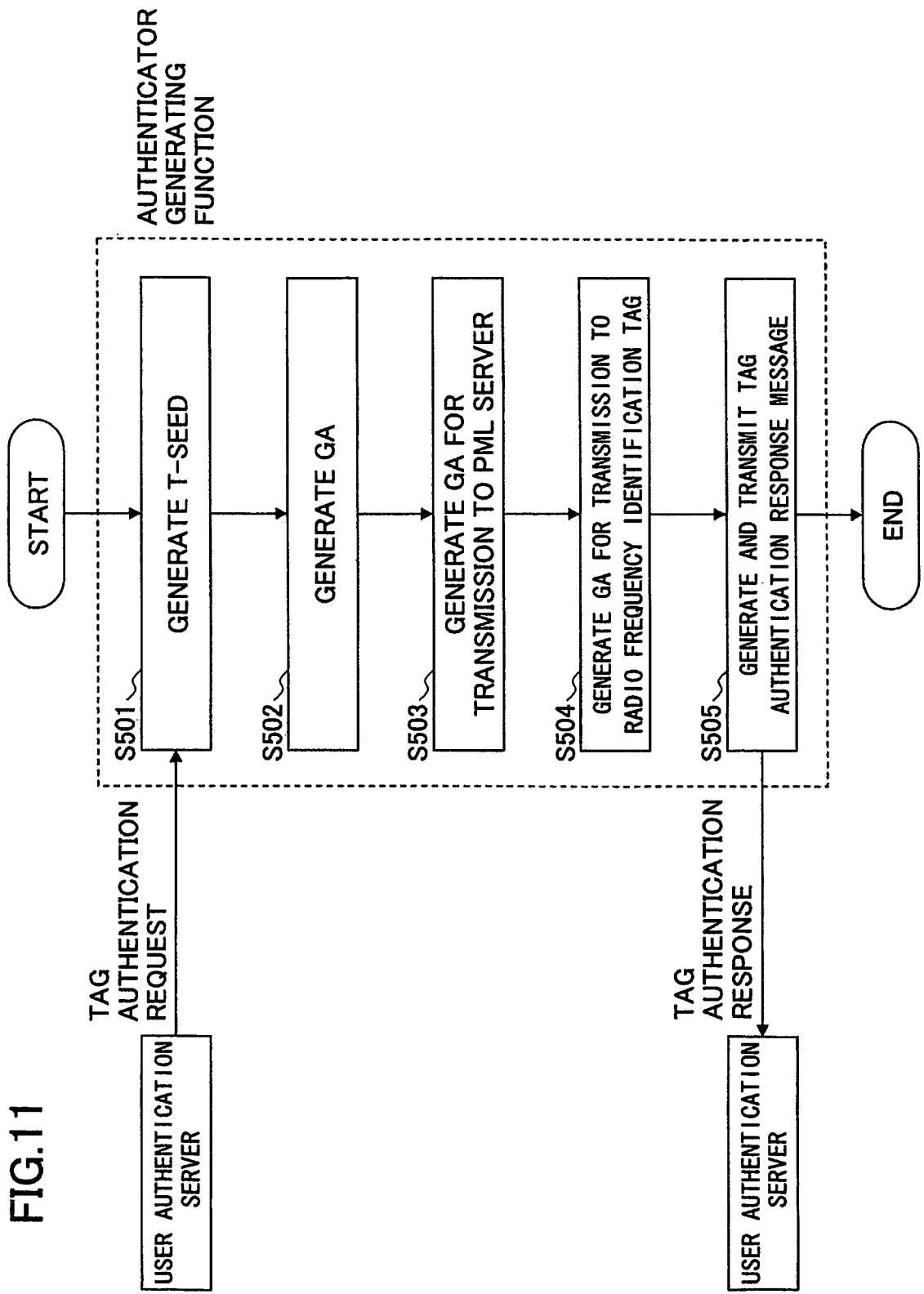
FIG. 11 is a processing flowchart of a tag management server 5.

FIG. 11 shows a processing flowchart of the tag management server 5. In the drawing, in step S501, the authenticator generating function 5-1 generates the one-time password T-SEED. The method of generating the T-SEED is not limited, and it is, for example, a digit sequence generated with 128-bit random numbers.

In step S502, the authenticator generating function 5-1 extracts the U-SEED from a tag authentication request message, and generates the group authenticator GA from it and the generated T-SEED. In step S503, the authenticator generating function 5-1 extracts the public key of the PML server 4 from the tag management DB 5-2, and encrypts the generated group authenticator GA with the extracted public key (generation of the GA2). If there are multiple PML servers 4, the PML server 4 is searched for by its identifier. The PML server 4 is determined, based on the tag identifier T-ID 1-3, by one of the PML information referrer client 2, the user authentication server 3, and the tag management server 5.

In step S504, the authenticator generating function 5-1 extracts the tag identifier T-ID 1-3 from the tag authentication request message, and extracts the secret shared with the radio frequency identification tag 1 by searching the tag management DB 5-2 by the tag identifier T-ID 1-3 transmitted from the user authentication server 3. The authenticator generating function 5-1 encrypts the generated group authenticator GA with the extracted secret key (generation of the GA1).

In step S505, the authenticator generating function 5-1 generates a tag authentication response message in which the two encrypted group authenticators are set, and transmits the tag authentication response message to the user authentication server 3.

Figure 12:
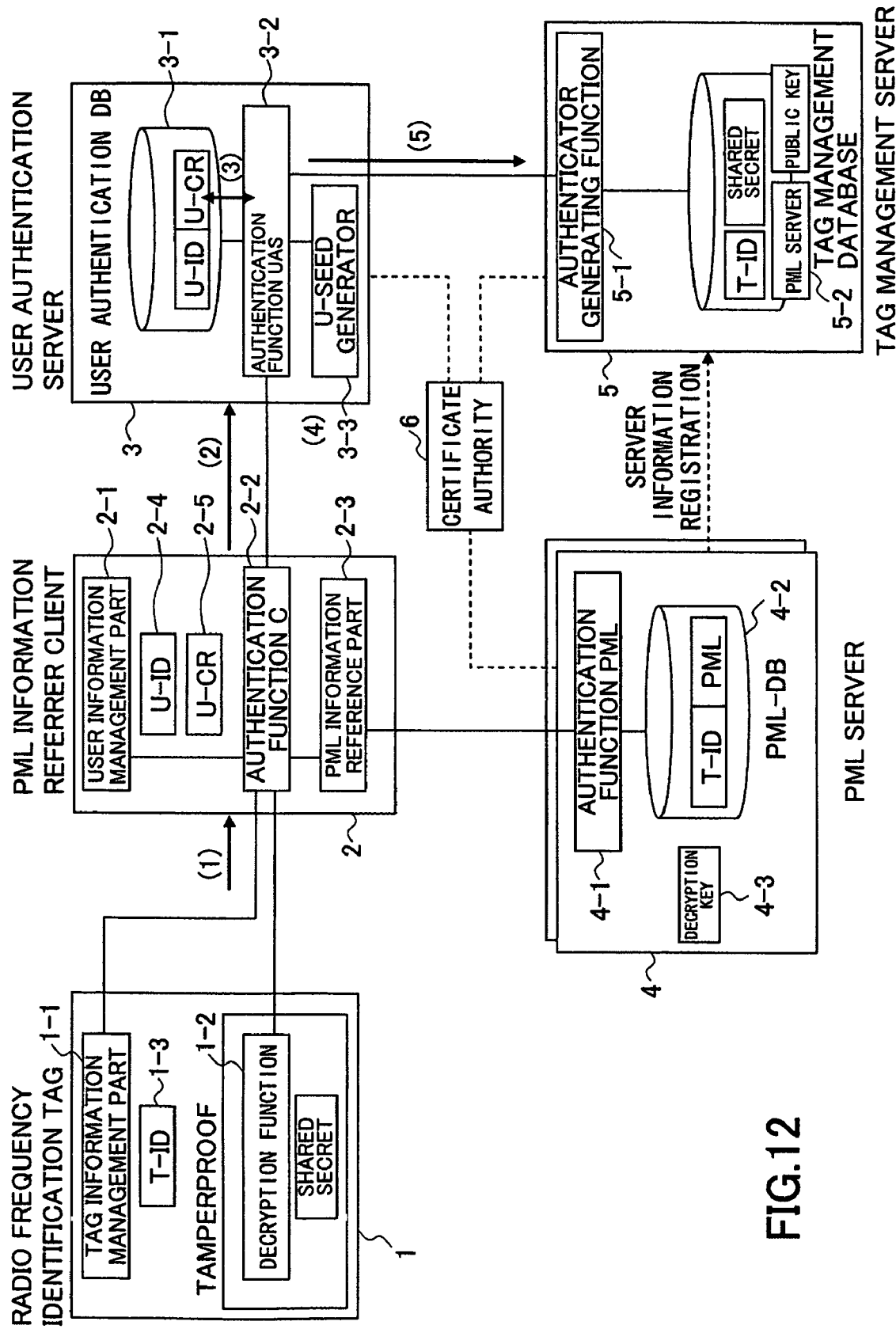
FIG. 12 is a diagram for illustrating a processing sequence of tag authentication.

FIG. 12 shows a diagram for illustrating a processing sequence of tag authentication. The following parenthesized numbers correspond to the parenthesized numbers of the arrows in the drawing.

(1) The group authentication function C 2-2 of the PML information referrer client 2 reads the radio frequency identification tag 1, and obtains the tag identifier T-ID 1-3 from the information management part 1-1 of the radio frequency identification tag 1 (step S201 in FIG. 7 and steps S101 through S103 of FIG. 6).

(2) The authentication function C2-2 of the PML information referrer client 2 obtains the user identifier U-ID 2-4 and the user credential U-CR 2-5 from the user information management part 2-1, and generates a radio frequency identification tag reference request message containing the T-ID 1-3, U-ID 2-4, and U-CR 2-5 and transmits it to the user authentication server 3 (steps S202 and S203 of FIG. 7).

(3) The authentication function UAS 3-2 of the user authentication server 3 extracts the U-ID 2-4 and U-CR 2-5 from the radio frequency identification tag reference request message, and compares them with the U-ID and U-CR contained in the user information DB 3-1 (step S301 of FIG. 9).

(4) When the authentication succeeds (the comparison result is a match), the one-time password U-SEED is generated using the U-SEED generator 3-3, and the U-SEED is digitally signed with the secret key of the user authentication server 3 (step S302 of FIG. 9).

(5) The authentication function UAS 3-2 generates a tag authentication request message containing the tag identifier T-ID 1-3 and the signed U-SEED, and transmits it to the tag management server 5 (step S303 of FIG. 9).

Figure 13:
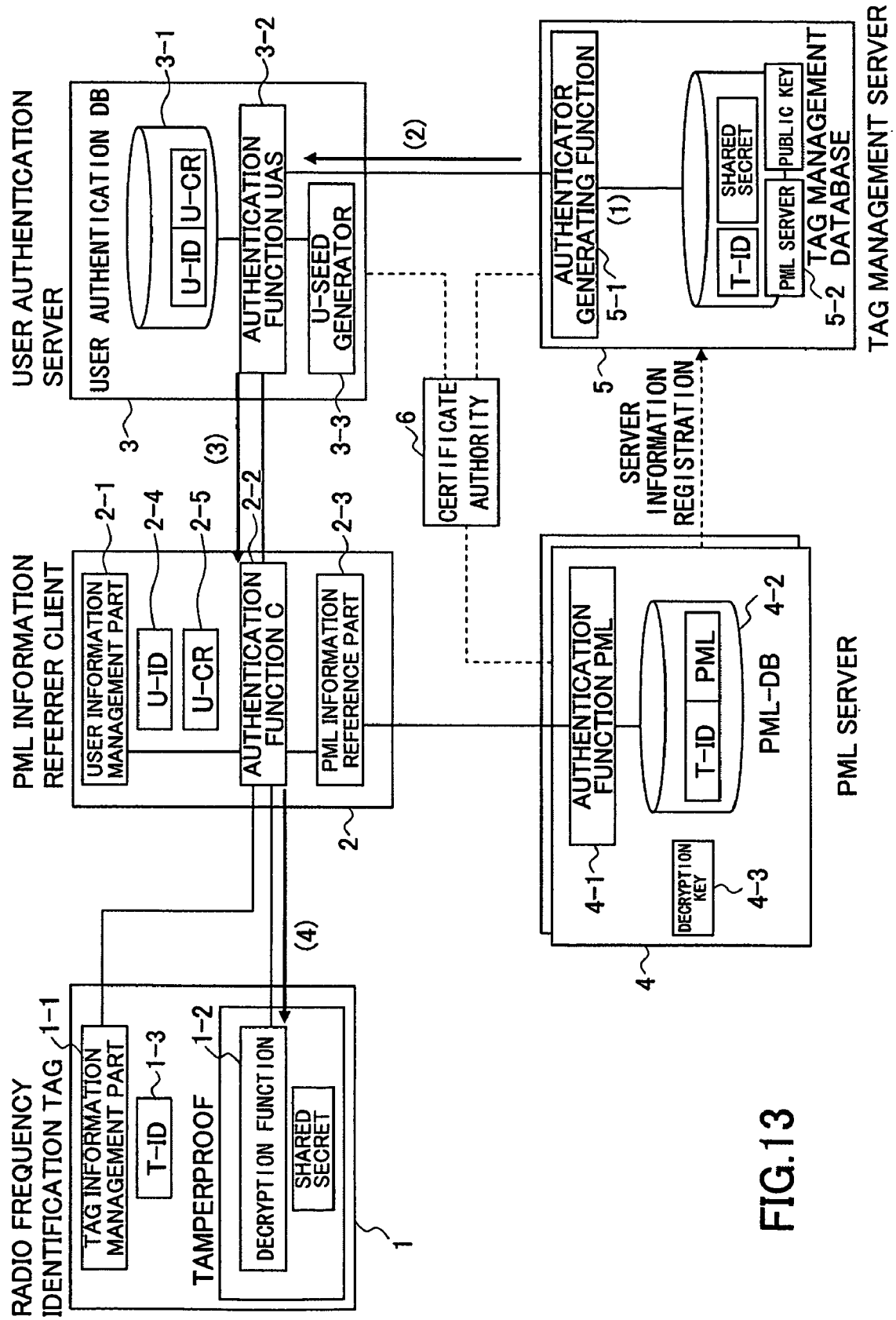
FIG. 13 is a diagram for illustrating a processing sequence of tag authentication acknowledgement.

FIG. 13 shows a diagram for illustrating a processing sequence of tag authentication acknowledgement. The following parenthesized numbers correspond to the parenthesized numbers of the arrows in the drawing.

(1) The authenticator generating function 5-1 of the tag management server 5 generates the one-time password T-SEED, and generates the group authenticator GA from it and the one-time password U-SEED transmitted in the tag authentication request message. The group authenticator GA is calculated by GA=G(U-SEED, T-SEED), where G( ) is a hash function. The authenticator generating function 5-1 extracts the secret key shared with the radio frequency identification tag 1 and the public key of the PML server 4 from the tag management DB 5-2, and encrypts the group authenticator GA with each of the keys. The encryption method is not limited, and encryption using a shared secret is determined by, for example, the following equation:

$$P(GA)=G(U\text{-SEED,key})XOR\ GA,$$

where P( ) is an encryption function, G( ) is a hash function, and XOR is an exclusive OR. Further, the encryption using the public key is based on a common method (steps S501 through S504 of FIG. 11).

(2) The authenticator generating function 5-1 creates a tag authentication response message containing the group authenticator GA1, encrypted with the secret key shared with the radio frequency identification tag 1, and the group authenticator GA2, encrypted with the public key of the PML server 4, for the user authentication server 3, and transmits it to the user authentication server 3 (step S505 of FIG. 11).

(3) The authentication function UAS 3-2 of the user authentication server 3 creates a radio frequency identification tag reference response message containing the GA1, GA2, and U-SEED, and transmits it to the PML information referrer client 2 (steps S304 and S305 of FIG. 9).

(4) The authentication function C 2-2 of the PML information referrer client 2 generates a GA decryption request command containing the GA1 and U-SEED transmitted in the radio frequency identification tag reference response message, and transmits it to the radio frequency identification tag 1 (steps S204 and S205 of FIG. 7).

Figure 14:
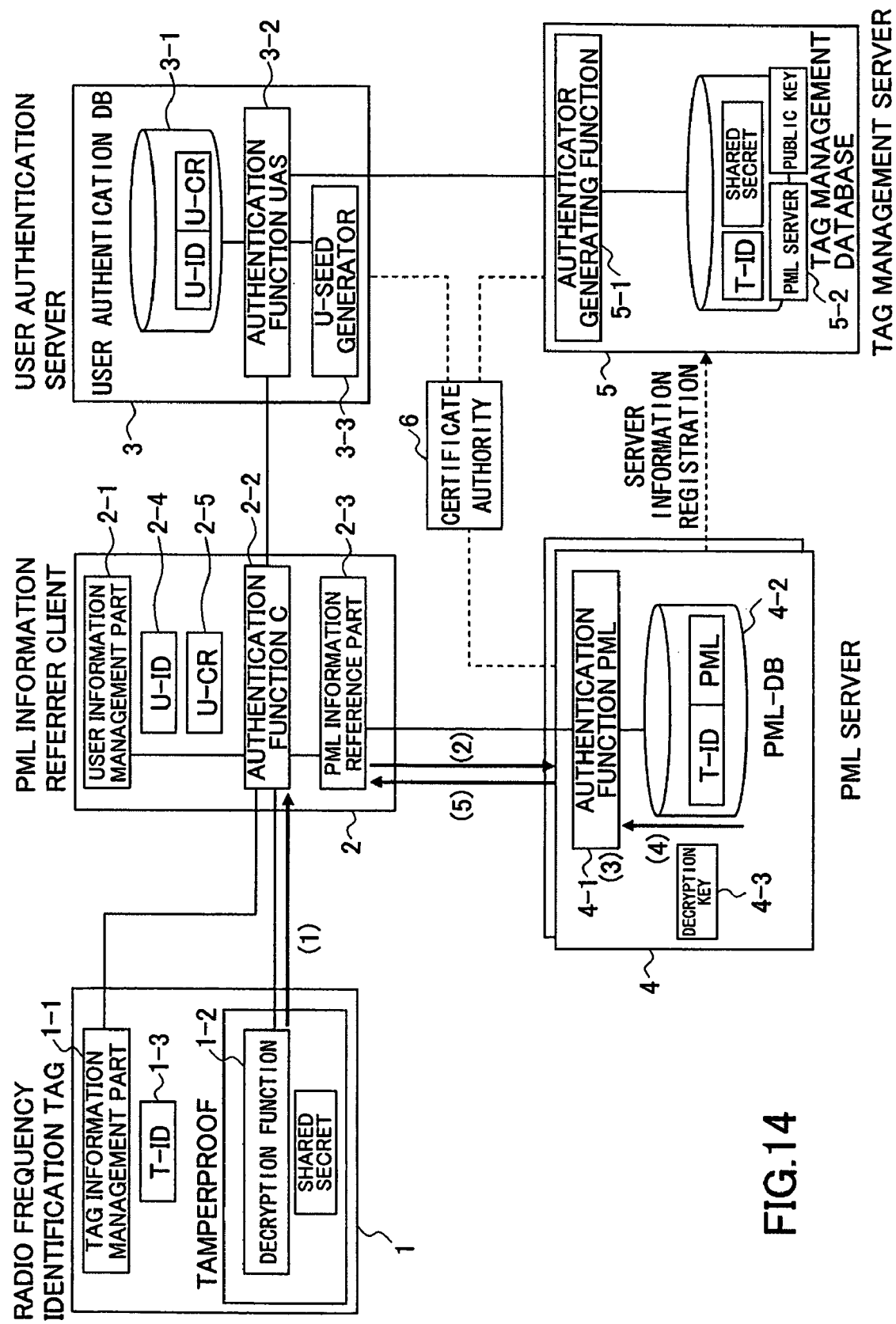
FIG. 14 is a diagram for illustrating a processing sequence of PML information reference.

FIG. 14 shows a diagram for illustrating a processing sequence of PML information reference. The following parenthesized numbers correspond to the parenthesized numbers of the arrows in the drawing.

(1) The decryption function 1-2 of the radio frequency identification tag 1 extracts the P(GA) and U-SEED from the GA decryption request command, and decrypts the group authenticator GA using the U-SEED and the shared secret key. The decryption method is given by, for example, the following equation:

$$GA=P(GA)XOR\ G(U\text{-SEED,shared secret key}).$$

The decryption function 1-2 returns the decrypted group authenticator GA to the PML information referrer client 2 as a response to the GA decryption request command (steps S104 and S105 of FIG. 6).

(2) The PML information reference part 2-3 generates a PML information request message containing the T-ID 1-3, U-SEED, GA, and GA2, and transmits it to the PML server 4 (steps S206 and S207 of FIG. 8).

(3) The authentication function PML 4-1 of the PML server 4 extracts the group authenticator GA2 from the PML information request message, and decrypts the group authenticator GA2 using the secret key (decryption key 4-3) of the PML server 4. The authentication function PML 4-1 compares the result of this operation with the group authenticator GA transmitted in the PML information request message (steps S401 through S403 of FIG. 10).

(4) When the authentication succeeds (the comparison result is a match), the authentication function PML 4-1 reads PML information from the PML-DB 4-2 (step S404 of FIG. 10).

(5) The authentication function PML 4-1 creates a PML information reference response message containing the T-ID 1-3 and PML, and transmits it to the PML information referrer client 2 (step S405 of FIG. 10).

Using the present invention makes it possible to authenticate the relationship between the radio frequency identification tag 1 and a user referring to the radio frequency identification tag 1 (PML information referrer client 2) in the PML server 4 managing the information of the radio frequency identification tag 1. Using this, it is possible to control information disclosure in various ways using group authentication in the PML server 4. Specific service examples are shown below.

First Embodiment

A description is given of an information provision service associated with commodities. As a sample service, an embodiment is shown in which a radio frequency identification tag reader is mounted in a cellular phone to read the radio frequency identification tags for product management of various purchased commodities, thereby downloading the URLs of home pages that provide information on commodities, new products, or the upgrading or recall of commodities, and automatically collecting information related to the purchased commodities to transmit the information to a user.

Figure 15:
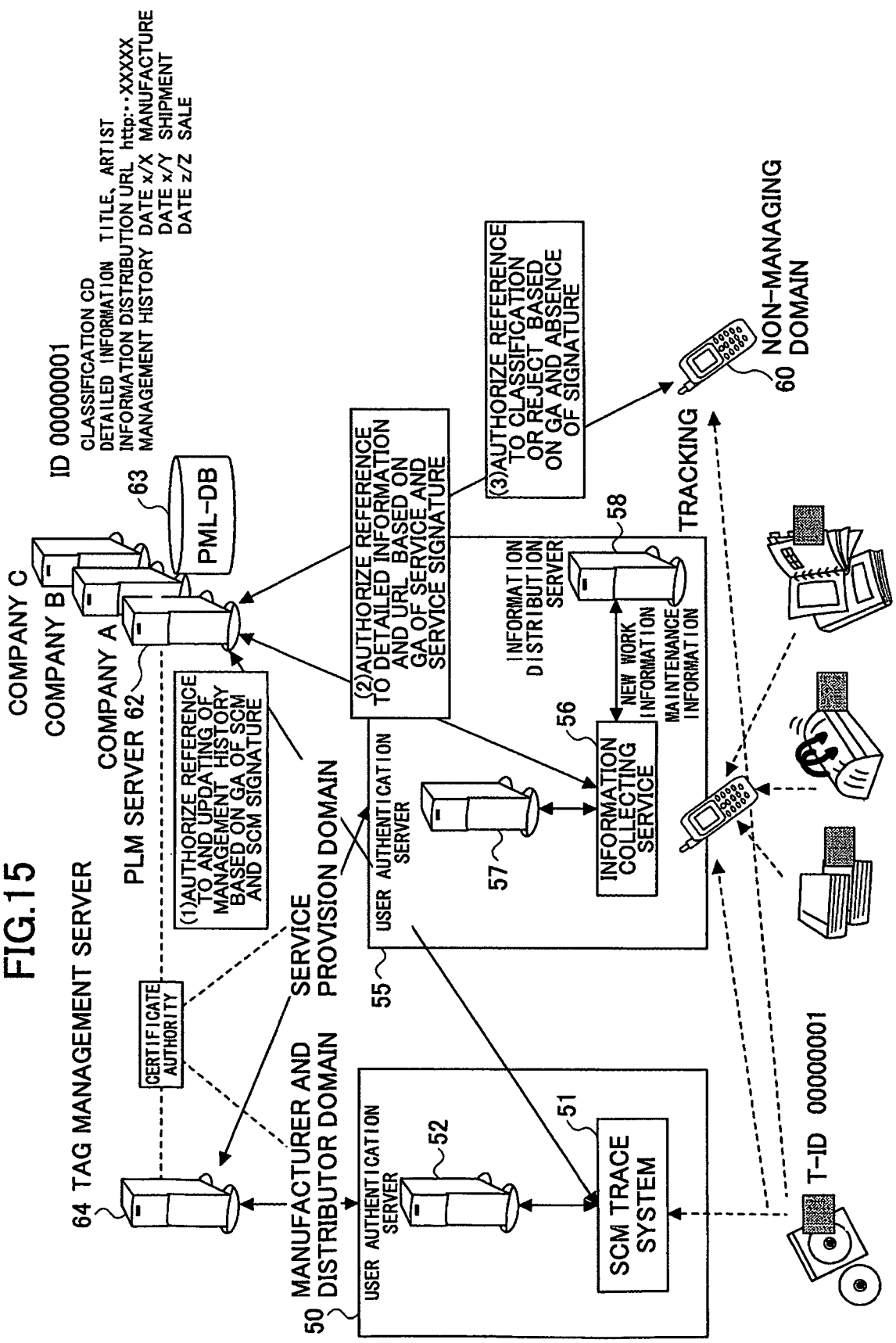
FIG. 15 is a diagram showing an image of provision of an information provision service.

FIG. 15 shows an image of provision of the information provision service. A user purchases a CD, a book, a bag, and a notebook, and subscribes to their related information by reading the radio frequency identification tags attached to the commodities. The information subscribed to is, for example, information on a new work by the artist or author in the case of the CD or book, introduction of a product of the same brand as the bag or information on accessories in the case of the bag, and information on replenishment goods such as paper in the case of the notebook.

Such a service is convenient to its user, but there is the risk of tracking by a third party as described above. Information on a CD or book is harmless itself. However, if even its title or author is known, this provides material for guessing a liking, and if the information has something to do with a price, this provides material for guessing affluence. Further, usually, a radio frequency identification tag is attached to a commodity for SCM purposes, and the management history of the commodity may be recorded in a PML server storing the information of the ID of the commodity indicated by the radio frequency identification tag. However, it may be desired to prevent such information from being open to general consumers.

Further, in a system that writes history information, a scheme is necessary for verifying the certainty of the system actually handling an object to be registered. Without such a scheme, history information can be falsified with ease, so that the base of a safe commodity management system using radio frequency identification tags or the like is undermined.

According to the present invention, a radio frequency identification tag is authenticated by using a one-time password for reference called a group authenticator that is different for every reference by combining a one-time password for a user and a one-time password for the tag at the time of referring to the radio frequency identification tag. Accordingly, different information can be provided by the same system for different purposes of use in SCM, providing a service to general users, and preventing tracking (illegal reading) by a third party.

In a sample service in FIG. 15, domains are distinguished as a manufacturer and distributor domain 50 that performs SCM of a commodity, a service providing domain 55 that provides a general user with a service using a radio frequency identification tag, and a non-managing domain 60 whose sole purpose is to collect the information of a radio frequency identification tag.

The manufacturer and distributor domain 50 includes an SCM trace system 51 for tracing a commodity and a user authentication server 52 for authenticating a person engaged in distribution, and sends S(U-SEED, SCM), which is the U-SEED digitally signed with the certificate SCM of the user authentication server 52, to a PML server 62 every time the radio frequency identification tag is referred to. S(XX, YY) indicates that XX is digitally signed with a secret key YY.

The service providing domain 55 includes an information collecting service 56 for providing various information items to a user, a user authentication server 57 that authenticates a user using a service, and an information distributing server 58 for distributing commodity information, and sends S(U-SEED, SERVICE), which is the U-SEED digitally signed with the certificate SERVICE of the user authentication server 57, to the PML server 62 every time the radio frequency identification tag is referred to.

In the case of this service, it is assumed that the PML server 62 described in the principle of the present invention has the function of being able to determine a requestor domain from the digital signature of the U-SEED and extracting information on the disclosure information policies determined between the PML server 62 and the user authentication servers 52 and 57 at the time of making a service use contract.

The contract is, for example, to authorize the manufacturer and distributor domain 50 to refer to and update a management history, to authorize detailed information and a URL for information reference for the service providing domain 55, and only classification information or rejection of a request for the non-managing domain 60.

Usually, the PML server 62 is managed on a commodity manufacturer basis. In the example service, the PML server of Company A, which is a CD seller/manufacturer, is shown as an example. The configuration of a PML-DB 63 includes a classification showing the type of an object, detailed information on the object, an information distributing URL, which is special information for the sample service, and information on the management history of the commodity.

A PML information reference request from the manufacturer and distributor domain 50 is expressed by GA=G(TSn, U-SEED), P(GA), and S(U-SEED, SCM), where G( ) is a hash function, TSn is the T-SEED of a current radio frequency identification tag, and SCM is the U-SEED issued by the authentication server 52 of the manufacturer and distributor domain 50.

The PML server 62 finds the group authenticator GA by decrypting P(GA) using a decryption key it possesses, and compares it with the group authenticator GA transmitted in the PML information reference request. If there is a match between the group authenticators GAs, the PML server 62 determines the requestor domain from the digital signature of S(U-SEED, SCM).

If the digital signature is SCM, the disclosure policy of authorizing reference to and updating of a management history is applied from the disclosure policy set at the time of making a contract, so that it is possible to authorize access to the management history in response to a request to access PML information from the manufacturer and distributor domain 50.

Likewise, a PML information reference request from the service providing domain 55 is expressed by GA=G(TSn, U-SEED), P(GA), and S(U-SEED, SERVICE). The digital signature SERVICE can be specified from S(U-SEED, SERVICE), so that Detailed Information and URL are determined as the information disclosure policy.

A PML information reference request from the non-managing domain 60 is expressed by GA=(TSn, U-SEED), P(GA), and S(U-SEED, UNKNOWN). Since no information corresponding to this digital signature is cached in the PML server 62, it is possible to determine that the access is from the non-managing domain 60, so that transmission of only classification information or rejection can be determined as the information disclosure policy.

It is important to check whether a corresponding object is actually referred to in the access to the history information of the PML-DB 63 in the manufacturer and distributor domain 50. A description is given, using FIG. 16, of the details of a tag authentication scheme of the present invention.

The same apparatuses as shown in the manufacturer and distributor domain 50 of FIG. 15 are shown in FIG. 16. A radio frequency identification tag of the present invention is attached to a commodity 66 for SCM. The SCM trace system 51 corresponds to the PML information referrer client 2 described in the principle of the present invention. The user authentication server 52 and the PML server 62 are also the same as those described in the principle of the present invention.

A tag identifier T-ID and a shared secret key are contained in a memory inside the radio frequency identification tag of the commodity 66 and the tag management DB 5-2 of the tag management server 64. The shared secret key is the secret information shared between the radio frequency identification tag and the PML server 62. The T-ID and the shared secret key, which actually are streams of numbers or letters having a bit length determined from encryption strength and a system load, are represented here by simple codes in order to facilitate distinction.

The tag identifier T-ID, which is a unique ID representing a commodity (which is a CD here), is expressed as "CD1." It is assumed that the shared secret key has a value of "SHKEY1." The SCM trace system 51 and the user authentication server 52 have a U-ID and a U-CR, which are information for authenticating a user. The U-ID, which is information that uniquely identifies the user, is expressed as "USER1" here. The U-CR, which is information identifying the user, such as a password, is expressed as "PWD" here.

A description is given below, following FIG. 16, of the details of a tag authentication sequence.

(1) In response to reference to the radio frequency identification tag of the commodity 66 by the SCM trace system 51, the radio frequency identification tag returns the T-ID="CD1."

(2) The SCM trace system 51 transmits a tag reference request message in which the U-ID="USER1" and the U-CR="PWD" in addition to the T-ID are set to the user authentication server 52.

(3) The user authentication server 52 extracts the U-ID and U-CR of the tag reference request message, and compares them with the U-ID and U-CR set in the user authentication DB 3-1. Since the values in the user authentication DB 3-1 are the U-ID="USER1" and the U-CR="PWD," the user is authenticated. The user authentication server 52 generates a U-SEED, which is a one-time password for referring to the radio frequency identification tag, using the U-SEED generator 3-3. The U-SEED, which is a stream of numbers or letters having a bit length determined from encryption strength and a system load, is expressed as "US1" here.

The user authentication server 52 generates a tag authentication request message in which are set the tag identifier T-ID transmitted from the SCM trace system 51 and S(US1, SKEY1), which is the generated U-SEED digitally signed using the secret key SKEY1 of the user authentication server 52, and transmits it to the tag management server 64. S(XX, YY) shows that XX is signed with a secret key YY.

(4) The tag management server 64 generates a T-SEED, which is a one-time password assigned to the radio frequency identification tag of this authentication. The T-SEED, which is a stream of numbers or letters having a bit length determined from encryption strength and a system load, is expressed as "TS1" here. Next, the tag management server 64 generates a group authenticator GA by subjecting the U-SEED and T-SEED to a hash function. The GA is expressed by G(U-SEED, T-SEED). G( ) is a hash function. In this case, GA=G(US1, TS1).

In order to confirm that the radio frequency identification tag is certainly referred to, the tag management server 64 encrypts the group authenticator GA using the SHKEY1, which is a key shared with the radio frequency tag, and the U-SEED, which is a variant used to prevent the shared key from being exposed. This encrypted GA is defined as GA1. The encryption algorithm is represented by the following equation, for example.

$$P(XX,YY,ZZ)=G(YY,ZZ) XOR\ XX,$$

where G( ) is a hash function, XOR is an exclusive OR, XX is a group authenticator, YY is a U-SEED, and ZZ is a shared key. Accordingly, GA1 is expressed by the following equation:

$$GA1 = P(GA, US1, SHKEY1)$$
$$= P(G(US1, TS1), US1, SHEKY1).$$

Further, the tag management server 64 encrypts the group authenticator GA using a PKEY2, which is the public key of the PML server 62, so that the PML server 62 can confirm the group authenticator GA. This encrypted GA is defined as GA2. The encryption algorithm follows common public key cryptography. Here, it is expressed as P(GA, KEY). Accordingly, it is expressed as GA2=P(G(US1, TS1), PKEY2). However, the present invention does not refer to the encryption algorithm itself.

The tag management server 64 transmits a tag authentication response message in which are set the signed U-SEED transmitted by the user authentication server 52 and the two encrypted group authenticators GA1 and GA2 to the user authentication server 52.

(5) The user authentication server 52 generates a radio frequency identification tag reference response message in which are set the T-ID="CD1" and the U-ID="USER1" as well as the signed U-SEED and two encrypted group authenticators GA1 and GA2 transmitted in the tag authentication response message, and transmits it to the SCM trace system 51.

(6) The SCM trace system 51 extracts the U-SEED="US1" from the signed U-SEED transmitted in the radio frequency tag reference response message, and transmits it together with the GA1 in a GA decryption request message to the radio frequency identification tag of the commodity 66.

(7) The radio frequency identification tag of the commodity 66 decrypts the GA1 from the shared key="SHKEY1" and the U-SEED="US1," which is the material of a hash function for decryption. This is, for example, calculated in the following equation:

$$P(GA) XOR\ G(US1, SHKEY1).$$

The radio frequency identification tag of the commodity 66 returns GA=G(US1, TS1) as a GA decryption response.

(8) In order to access the PML-DB 63, the SCM trace system 51 transmits the group authenticator GA=G(US1, TS1) decrypted by the radio frequency identification tag of the commodity 66, the GA2, and the signed U-SEED to the PML server 62 as a PML information reference message.

The PML server 62 decrypts the encrypted group authenticator GA2 with a secret key SKEY2, which is a decryption key. The decryption result is G(US1, TS1). This matches the group authenticator GA contained in the PML information reference message. Therefore, it is possible to confirm that the SCM trace system 51 is properly referring to the radio frequency identification tag of the commodity 66.

(9) The PML server 62 opens an access pass to the PML-DB 63 to the SCM trace system 51.

As described above, in the system using the present invention, the U-SEED, which is a one-time password for a user generated as a result of user authentication and is the seed of decryption of the group authenticator GA, and a shared secret key recorded in a unit having a tamperproof characteristic (the characteristic of not allowing a peek from outside) in the radio frequency identification tag are necessary in order to refer to the radio frequency identification tag.

The group authenticator GA checked by the PML server 62 is the hash value of the U-SEED and the T-SEED, which is a dynamically changing one-time password of the radio frequency identification tag. When the U-SEED is issued, the T-SEED also changes. Therefore, it is possible to certify that there is a proper correlation between the radio frequency identification tag 1 and its referrer.

According to the present invention, the relationship between a radio frequency identification tag and a user who refers to the radio frequency identification tag is authenticated. Therefore, it is possible to prevent intentional information manipulation that attacks the absence of a check on whether the radio frequency identification tag is properly referred to or an information confusing attack that notifies a server of the same ID simultaneously at multiple points.

Further, it is possible to impose restrictions on an observer who has not clearly indicated the relationship with the radio frequency identification tag, such as suspension of information disclosure, by controlling disclosure using group authentication, and it is possible to prevent information tracking by making the granularity of information coarse.

Further, the tag management server is provided independent of the PML server, the tag management server manages a key that is a secret shared with the radio frequency identification tag, and a group authenticator is generated and encrypted with the public key of the PML server in the tag management server so as to be transmitted to the PML server, thereby performing unified management of the key that is the secret shared with the radio frequency identification tag in the tag management server. This facilitates association with multiple PML servers.

Further, the PML server is not provided with a database for authenticating the radio frequency identification tag, and the information of the group authenticator encrypted with the public key of the PML server and the group authenticator decrypted in another device are incorporated into a message requesting PML information. This makes it possible to perform authentication only through an operation of the message information, so that it is possible to perform authentication at high speed.

Further, the T-SEED, which is a variant, is not written into the radio frequency identification tag, and the radio frequency identification tag is caused to decrypt the group authenticator. This makes it possible to prevent occurrence of a mismatch in information between the radio frequency identification tag and the management server due to failure in writing the T-SEED.

The tag identifier T-ID may correspond to the identification information of an object, the PML information may correspond to the information of the object, the one-time password T-SEED may correspond to a first value, the one-time password U-SEED may correspond to a second value, the group authenticator GA may correspond to a third value, the radio frequency identification tag 1 may correspond to a tag device, the PML information referrer client 2 may correspond to an information referrer client, the user authentication server 3 may correspond to an authentication server, the PML server 4 may correspond to an information server, the tag information management part 1-1 may correspond to a tag information management part, the decryption function 1-2 may correspond to a decryption part, the authentication function C 2-2 may correspond to a client authentication part, the PML information reference part 2-3 may correspond to an information reference part, the authentication function UAS 3-2 may correspond to a user authentication part and an authentication request part, the U-SEED generator 3-3 may correspond to a second value generation part, the PML-DB 4-2 may correspond to an object information database, and the authentication function PML 4-1 may correspond to a reference authentication part.

What is claimed is:

1. An authentication method making identification information of an object public and performing authentication in referring, from the identification information, to information of the object corresponding to the identification information, the authentication method comprising the steps of:
   generating a third value through a predetermined operation of a temporary first value generated every time the identification information is referred to and a temporary second value generated for a referrer to the identification information;
   encrypting the third value by first and second encryption methods different from each other;
   decrypting the third value encrypted by the first encryption method in a tag device attached to the object; and
   decrypting the third value encrypted by the second encryption method in an apparatus managing the information of the object, and comparing the third value decrypted in the apparatus with the third value decrypted in the tag device, thereby verifying a relationship between the object and the referrer thereto.

2. The authentication method as claimed in claim 1, wherein the referrer is subjected to authentication, and the second value is issued if the referrer is authenticated.

3. The authentication method as claimed in claim 2, wherein:
   an apparatus performing tag management encrypts the third value by the first encryption method using a shared secret key and transmits the encrypted third value to the tag device, and
   the tag device, using the shared secret key, decrypts the third value encrypted by the first encryption method.

4. The authentication method as claimed in claim 3, wherein:
   the apparatus performing the tag management encrypts the third value by the second encryption method using a public key and transmits the encrypted third value to the apparatus managing the information of the object, and
   the apparatus managing the information of the object, using the public key, decrypts the third value encrypted by the second encryption method.

5. An authentication system, comprising:
   a tag device attached to an object and configured to make identification information of the object public and decrypt a third value encrypted by a first encryption method;
   an information referrer client configured to refer to information of the object corresponding to the identification information of the object made public by the tag device;
   an authentication server configured to authenticate a referrer to the object and generate a temporary second value for the referrer to the identification information;
   a tag management server configured to generate a temporary first value every time the identification information is referred to, to generate a third value through a predetermined operation of the first value and the second value from the authentication server, and to encrypt the third value by the first encryption method and a second encryption method different from each other; and
   an information server configured to manage the information of the object corresponding to the identification information, and to verify a relationship between the object and the referrer thereto by decrypting the third value encrypted by the second encryption method and comparing the decrypted third value with the third value decrypted in the tag device,
   wherein the information referrer client is allowed to refer to the information of the object corresponding to the identification information in response to the verification by the information server.

6. The authentication system as claimed in claim 5, wherein:
   the information referrer client and the authentication server are provided on a domain basis,
   the authentication server is configured to digitally sign the second value with a certificate of the authentication server and causes the signed second value to be transmitted to the information server through the information referrer client, and
   the information server is configured to identify a domain of the authentication server from the digital signature of the second value and control disclosure of the information of the object in accordance with a disclosure control policy corresponding to the domain.

7. A tag device of an authentication system making identification information of an object public and performing authentication in referring, from the identification information, to information of the object corresponding to the identification information, the tag device comprising:
   a tag information management part configured to return the identification information of the object in response to a request from an information referrer client referring to the information of the object; and
   a decryption part configured to decrypt a third value encrypted by a first encryption method.

8. An information referrer client of an authentication system making identification information of an object public and performing authentication in referring, from the identification information, to information of the object corresponding to the identification information, the information referrer client comprising:

a client authentication part configured to make a reference request by attaching, to identification information of an object made public by a tag device, user information corresponding to a referrer to the identification information, and transmit a third value encrypted by a first encryption method and contained in a response to the reference request to the tag device attached to the object; and an information reference part configured to make an information reference request to an information server managing the information of the object corresponding to the identification information by including therein the identification information of the object made public by the tag device, the third value decrypted in and returned from the tag device, and the third value encrypted by a second encryption method and contained in the response to the reference request.

9. An authentication server of an authentication system making identification information of an object public and performing authentication in referring, from the identification information, to information of the object corresponding to the identification information, the authentication server comprising:

a user authentication part configured to authenticate a user by searching a user authentication database containing information on a plurality of users by information on the user from an information referrer client;

a second value generation part configured to generate a temporary second value for a referrer to the identification information in response to the user authentication; and an authentication request part configured to make an authentication request to a tag management server using the identification information of the object and the second value, wherein a third value encrypted by a first encryption method and the third value encrypted by a second encryption method transmitted from the tag management server as a response to the authentication request are transmitted to the information referrer client.

10. The authentication server as claimed in claim 9, wherein said second value generation part is configured to digitally sign the second value with a certificate of the authentication server and transmits the signed second value to the information referrer client.

11. An information server of an authentication system making identification information of an object public and performing authentication in referring, from the identification information, to information of the object corresponding to the identification information, the information server comprising:

an object information database containing the information of the object corresponding to the identification information; and a reference authentication part configured to verify a relationship between the object and a referrer thereto by decrypting a third value encrypted by a second encryption method and transmitted from an information referrer client and comparing the decrypted third value with the third value transmitted from the information referrer client, and refer to the object information database using the identification information of the object transmitted from the information referrer client in response to the verification.

* * * * *